United States Patent [19]

Hillman

[11] 4,107,540
[45] Aug. 15, 1978

[54] PRESSURE ACTUATED LIGHT PEN

[75] Inventor: Garth Decker Hillman, Ottawa, Canada

[73] Assignee: Northern Telecom Limited, Montreal, Canada

[21] Appl. No.: 790,264

[22] Filed: Apr. 25, 1977

[51] Int. Cl.² .............................................. G06K 7/10
[52] U.S. Cl. ..................................... 250/566; 235/472
[58] Field of Search ................ 235/472, 473; 250/227, 250/566, 567, 568, 555, 216

[56] References Cited

U.S. PATENT DOCUMENTS

| | | | |
|---|---|---|---|
| 3,892,974 | 7/1975 | Ellefson et al. | 250/568 |
| 3,911,270 | 10/1975 | Traub | 250/566 |
| 3,920,959 | 11/1975 | Wefers et al. | 235/472 |

Primary Examiner—David C. Nelms
Attorney, Agent, or Firm—Sidney T. Jelly

[57] ABSTRACT

A pressure actuated light pen attached to the end of an optical fiber bundle has a retractable shutter mechanism at its forward end. The shutter mechanism comprises a plurality of wedge-shaped sections, resiliently urged in a forward direction to at least substantially close off light admittance, and moveable rearwards along inclined paths to produce an aperture at their forward ends, the light pattern at the aperture focussed on the ends of the fibres.

6 Claims, 6 Drawing Figures

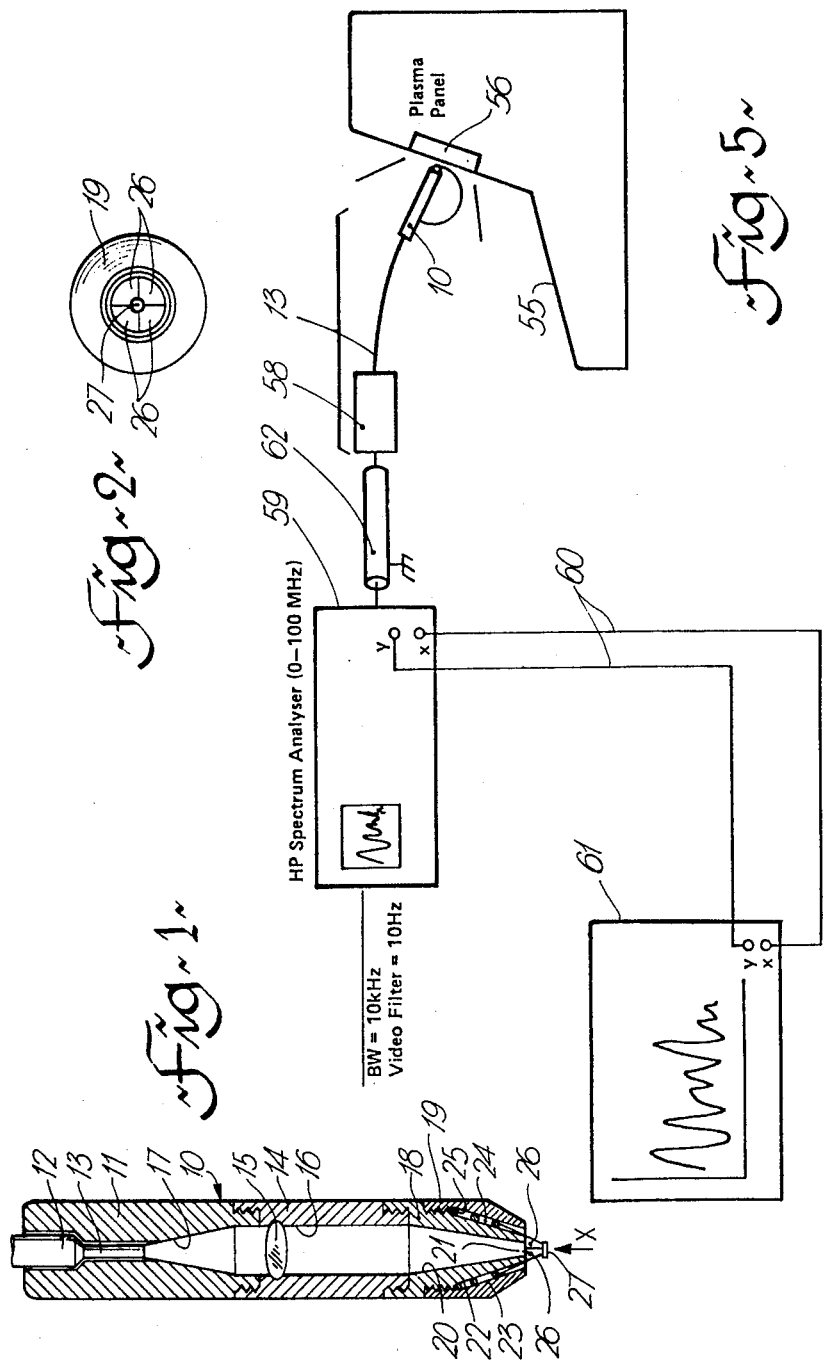

PRESSURE ACTUATED LIGHT PEN

This invention relates to a pressure actuated light pen, such as are used in conjunction with electronic displays for example plasma panels and cathode ray tubes, and to a system associated with the light pen, including a fibre bundle connector and optical receiver and signal processing circuitry.

Light pens are used in association with lighted displays, an electronic light detector being positioned at or adjacent to the "point" or active end of the pen. A pressure actuated switch electrically connects the detector, and any immediately associated electronic circuitry, such as an amplifier, to the signal processing circuitry. The pressure actuation occurs either by the pen contacting the display or by closing of a switch by a finger of the operator. This avoids spurious signals being received by the processing circuit when the pen is not directed at the display. Such devices are subject to electronic "noise" at the display surface and the electrical leads from the pen to the processing circuit also are sensitive to external "noise" sources.

The present invention is concerned with the use of a pen which uses optical fibres to transmit the signal from the pen to a remote detector. To prevent spurious signals, it is arranged that the image focussed onto the end of the fibre bundle is at a minimum brightness or intensity, which maximum may be zero, when the pen is removed from a display, the image being at maximum intensity when the pen is pressed fully against the display.

The pen comprises a body which at a rear end fits on one end of a fibre bundle, has a shutter mechanism at the forward end, the shutter mechanism comprising a plurality of wedge-shaped sections urged forward by a spring or similar device and sliding rearwards and outwards by pushing the pen onto a display surface, and has a lens system between the shutter mechanism and the fibre bundle end for focussing an image of the light spot or pattern at the forward end onto the end of the fibre bundle.

The invention will be readily understood by the following description of an embodiment, by way of example, in conjunction with the accompanying drawings, in which:

FIG. 1 is a longitudinal cross-section of the light pen;

FIG. 2 is an end view in the direction of arrow X in FIG. 1;

FIG. 5 is a schematic drawing of a system embodying a light pen as in FIGS. 1 and 2.

Figure 3:
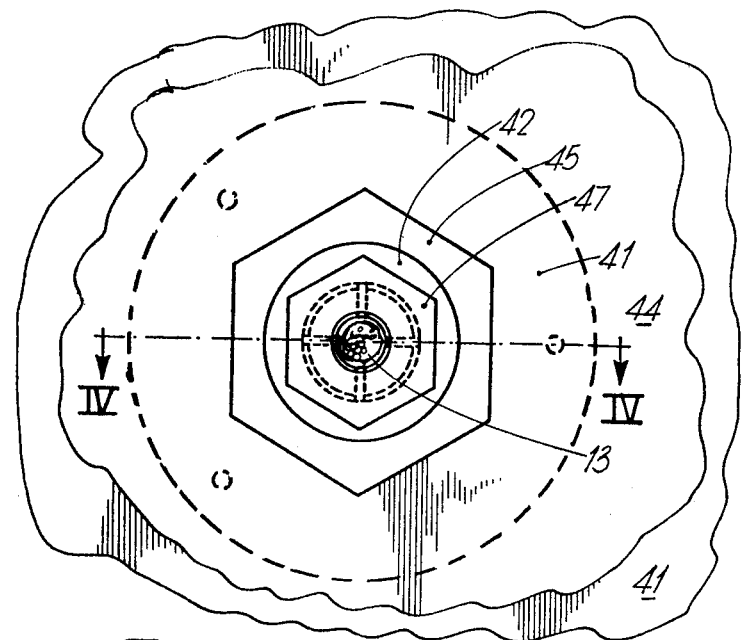
FIG. 3 is a plan view of one form of fibre bundle connector.

The light pen 10, as illustrated in FIGS. 1 and 2, is an elongated tubular member having a rear portion 11 in which is fastened the end of a fibre bundle 12. The ends of the fibres of the bundle 12 have the plastic coating removed and are sheathed in a metal sleeve which extends back over the plastic coating. A centre portion 14 supports a lens system 15, the distance between the lens system 15 and the ends of the fibres being predetermined, and being the image length of the lens system. The lens system 15 is mounted in a parallel bore 16 in the centre portion 14, and a tapered bore 17 extends from the junction between the rear portion 11 and the centre portion 14 to the ends of the fibres.

To the forward end of the centre portion 14 is attached a shutter mounting structure comprising an inner member 18 and an outer member 19. The inner member 18 is attached to the forward end of the centre portion 14 and the outer member 19 is attached to and surrounds the forward end of the inner member 18. Inner member is conical having a tapered bore 20, the bore tapering towards the forward end and finishing in an aperture 21. The outside of the inner member is also tapered and recessed at 22. The bore 23 of the outer member is tapered to match the taper of the outside of the inner member and is also recessed at 23. The two recesses 22 and 23 cooperate to form an annular space 24 between inner and outer members 18 and 19, the annular space 24 also tapering in mean diameter toward the forward end.

Positioned in the annular space 24 is a light compression spring 25 and a shutter composed of, in the present example, four arcuate segmental members 26. Pressure on the outer ends 27 of the segments 26 will push the segments up into the annular space against the pressure of the spring 25. The ends 27 of the segments can be rounded to provide for smooth sliding over a plasma or other display. The annular space 24 is dimensioned such that the segments 26 can move upwards, even though the relative radii of segment and space will vary as the segments move up. The spring 25 and the segments 26 can readily be initially assembled by slight deformation. The segments are preferably of a spring material.

When the pen is not in use, the segments 26 are in a forward position, as illustrated in FIG. 1, closing the inlet or aperture 21. When the pen is lightly pushed against the display surface the segments 26 are pushed back and light can enter through the aperture 21. The light source at the inlet 21 is focussed by the lens 15 onto the end of the fibre bundle 13. The distances between the lens 15 and aperture 21 and lens 15 and the end of the fibre bundle 13 are such as to provide a focussed image of the light source at aperture 21 on the fibre bundle end.

Figure 4:
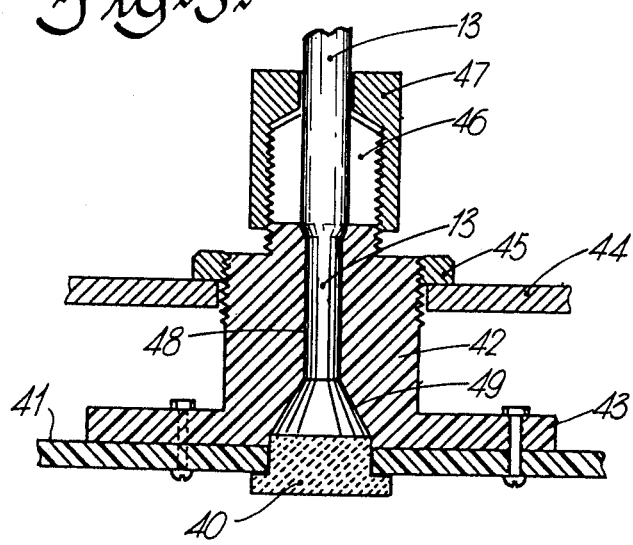
FIG. 4 is a cross-section on the line IV—IV of FIG. 3.

The coupling of the fibre bundle to the optical detector should be capable of repeated disconnect and reconnect while retaining coaxial alignment and separation between fibre bundle and detector. FIGS. 3 and 4 illustrate one form of connector arrangement in which the detector is permanently attached to the printed ciruit board and serves to index a connector which is attached to the same printed circuit board.

As illustrated in FIG. 4, the detector 40, for example an avalanche diode is mounted on printed circuit board 41. The connector has a cylindrical body portion 42 which extends from a rear flange 43. The flange 43 serves to mount the connector on the printed circuit board. In the example illustrated, the body portion 42 extends through a panel 44, a nut 45 being screwed onto the end of the body portion, thereby permitting the separation between the panel 44 and the printed circuit board 41 to be received. Extending from the body portion 42 is a split collet portion 46 tightened by a nut 47. The collet portion 46 grips the sheathed fibre bundle 13. The end portion of the fibre bundle extends down through an axial bore 48 in the body portion 42 and the end of the bundle is positioned a predetermined short distance from the detector. A divergent bore 49 extends from the position of the end of the fibre bundle to the forward face of the detector 40.

FIG. 5 illustrates one form of system incorporating the light pen of FIGS. 1 and 2. The light pen 10 is shown in a detecting position relative to a display terminal 55, being positioned adjacent a plasma panel 56. The light pen 10 is connected by the optical fibre bundle 13 via a detector and signal processing circuit indicated at 58, to a spectrum analyser 59 via a 50Ω coaxial cable 62. A typical analyser is a Hewlett-Packard 14IT plug in spectrum analyser system. From the analyser 59 connections 60 extend to a chart recorder 61. The spectrum analyser 59 and the chart recorder 61 provide a visual indication and a permanent record respectively of signals detected by the receiver 58, and fed to the receiver from the light pen 10.

Figure 6:
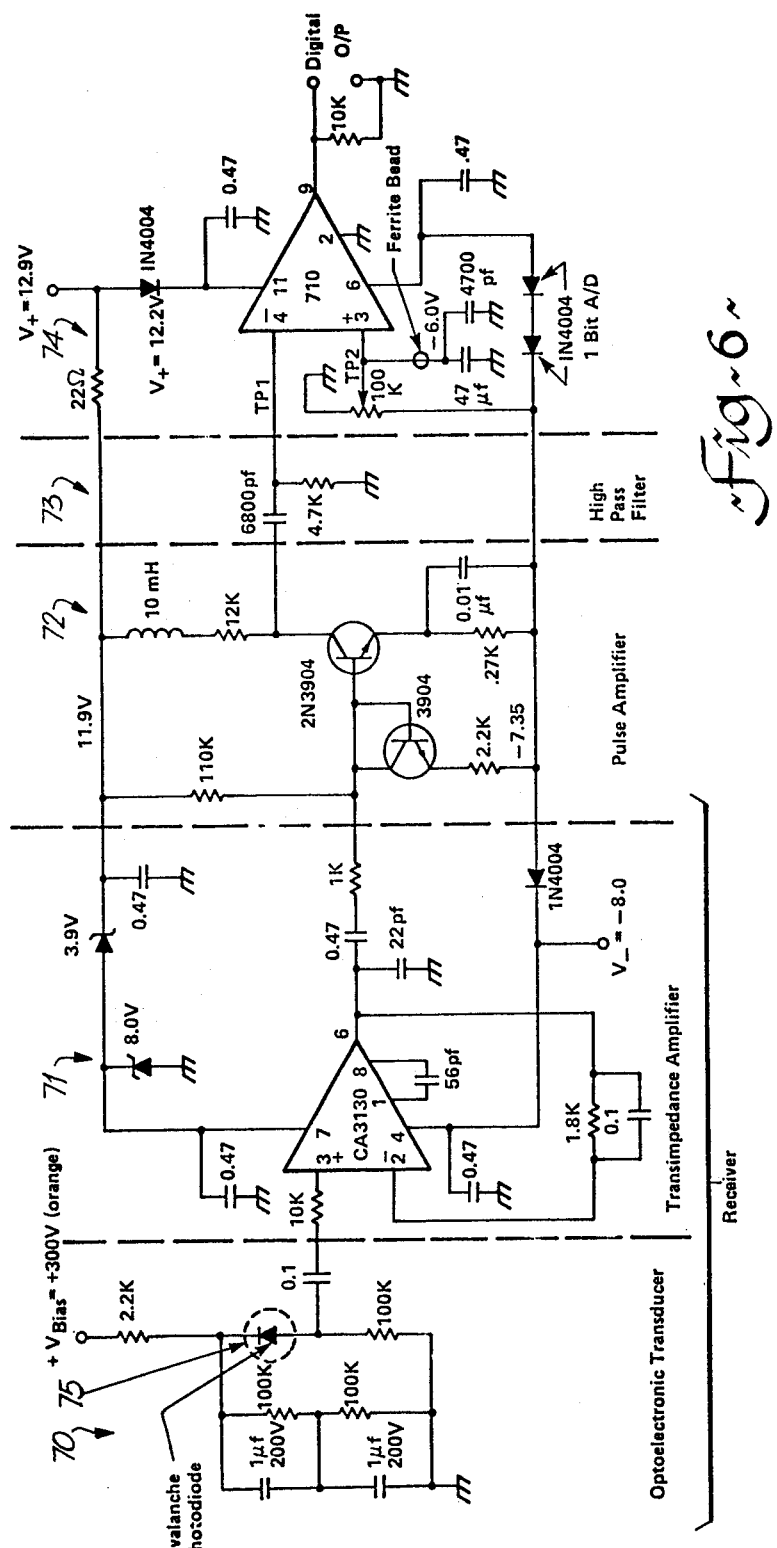
FIG. 6 is a receiver and signal processing circuit.

FIG. 6 is a typical circuit for the signal receiver and processing circuit. The circuit as illustrated in FIG. 6 comprises an optoelectronic transducer 70 and a transimpedance amplifier 71, which together form a receiver. This is followed by a pulse amplifier 72, a high pass filter 73 and an analog-to-digital comparator 74.

The individual circuit sections 70 to 74 are not of themselves novel and are of well known form. Typical values are shown for the individual items for the circuit sections.

The fibre bundle 13, of FIGS. 1 to 4, is connected to the avalanche photodiode 40 in FIG. 4, also indicated as the optoelectronic transducer 70, by the fibre to diode connector illustrated by the dotted circle 75. The optical signal received via the fibre bundle is transformed into an electrical signal in the optoelectronic transducer 70 and passed to the signal processing circuits via the transimpedance amplifier 71 which buffers the high impedance photodetector circuit of the optoelectronic transducer 70 from the low impedance signal processing circuit 72, 73 and 74. The pulse amplifier 72 amplifies the electrical pulse from the buffer or transimpedance amplifier 71, having frequency components of not greater than 700 KHz and not less than 50 KHz. The high pass filter 73 provides further attenuation of the frequencies less than 1.33 KHz in the signal output from the pulse amplifier 72. The one bit analog-to-digital circuit 74 is a comparator. The peak of the amplified and filtered electrical signal from the filter 73 is compared with an adjustable threshold. If the peak value exceeds the threshold, a standard 5 volt digital signal is outputted from the comparator. This digital signal is sustained for the duration of time that the peak amplitude exceeds the threshold value. The output from the comparator or analog-to-digital circuit 74 appears at the output terminals 76.

What is claimed is:

1. A pressure actuated light pen, comprising:
    a tubular body having front and rear end parts;
    means for connecting one end of an optical fibre bundle to said rear part, the end of said bundle at a predetermined position in said body;
    means supporting a plurality of wedge-shaped members side-by-side in said front part for sliding movement in a conical path;
    resilient means urging said wedge-shaped members to a forward position extending beyond said body, said members in contact with each other and closing off said body;
    said wedge-shaped members slidable rearwardly, on pressure on forward ends of said members, along said conical path, said wedge-shaped members moving apart and opening an aperture at said forward ends;
    a lens structure in said body and positioned to image said aperture on said end of said fibre bundle;
    a light image at said aperture focussed on said end of the fibre bundle when said wedge-shaped members are moved rearwardly and said aperture is at a predetermined position.

2. A light pen as claimed in claim 1, said means supporting a plurality of wedge-shaped members comprising inner and outer members forming said forward part of said body, said inner member having a tapered outer surface, said surface tapering inwardly and forwardly, said outer member having a tapered bore, tapering inwardly and forwardly, said tapered outer surface and said tapered bore substantially parallel and coaxial to form a conical annular space, the wedge-shaped members mounted in said space.

3. A light pen as claimed in claim 2, said resilient means comprising a compression spring at a rearward part of said conical annular space.

4. A light pen as claimed in claim 2, said wedge-shaped members comprising arcuate segments.

5. A light pen as claimed in claim 1, including an optical fibre bundle connected at said one end to said tubular body, and an optical detector connected to the other end of said fibre bundle, for producing a signal indicative of said light image.

6. A light pen as claimed in claim 5, including a signal receiver and processing circuit.

* * * * *